(12) United States Patent
Ozeki

(10) Patent No.: US 8,736,872 B2
(45) Date of Patent: May 27, 2014

(54) IMAGE FORMING SYSTEM AND PRINT INSTRUCTION TERMINAL

(75) Inventor: Kazunori Ozeki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 365 days.

(21) Appl. No.: 12/862,368

(22) Filed: Aug. 24, 2010

(65) Prior Publication Data

US 2011/0222108 A1    Sep. 15, 2011

(30) Foreign Application Priority Data

Mar. 11, 2010   (JP) ................... 2010-054549

(51) Int. Cl.
- *G06F 3/12* (2006.01)
- *G06K 15/00* (2006.01)
- *G06F 17/00* (2006.01)
- *G03G 15/00* (2006.01)

(52) U.S. Cl.
USPC ......... 358/1.15; 358/1.1; 358/1.13; 358/1.16; 358/1.18; 715/274; 399/81

(58) Field of Classification Search
USPC ............... 358/1.15, 1.1, 1.13, 1.16, 1.18; 715/274; 399/81
See application file for complete search history.

(56) References Cited

U.S. PATENT DOCUMENTS

| | | | |
|---|---|---|---|
| 2003/0053104 A1 | 3/2003 | Morisaki et al. | |
| 2006/0203289 A1* | 9/2006 | Miyata | 358/1.18 |
| 2006/0215196 A1 | 9/2006 | Someno | |
| 2008/0175616 A1* | 7/2008 | Nishida | 399/81 |
| 2010/0027056 A1* | 2/2010 | Ogino et al. | 358/1.15 |

FOREIGN PATENT DOCUMENTS

| | | |
|---|---|---|
| JP | 10-150521 A | 6/1998 |
| JP | 2002-149365 A | 5/2002 |
| JP | 2003-63109 A | 3/2003 |
| JP | 2004-243635 A | 9/2004 |
| JP | 2005-250968 A | 9/2005 |
| JP | 2006-302262 A | 11/2006 |
| JP | 2007-249713 A | 9/2007 |

OTHER PUBLICATIONS

Office Action dated Dec. 18, 2013 issued by the Japanese Patent Office in counterpart Japanese Patent Application No. 2010-054549.

* cited by examiner

*Primary Examiner* — Miya J Cato
*Assistant Examiner* — Temitayo Folayan
(74) *Attorney, Agent, or Firm* — Sughrue Mion, PLLC

(57) ABSTRACT

An image forming system includes: a print instruction terminal; and a print apparatus having a printing unit that prints print data instructed to be printed from the print instruction terminal. The print instruction terminal includes: a setting information receiving unit that receives print setting information including paper attributes; a loading method displaying unit that displays a method of loading paper corresponding to the print setting information received by the setting information receiving unit in a feeding unit of the print apparatus; and a transmitting unit that transmits the print setting information. The print apparatus includes a print controlling unit that receives the print setting information and controls the printing unit to print the print data instructed to be printed from the print instruction terminal based on the print setting information when the paper is loaded in the feeding unit.

9 Claims, 8 Drawing Sheets

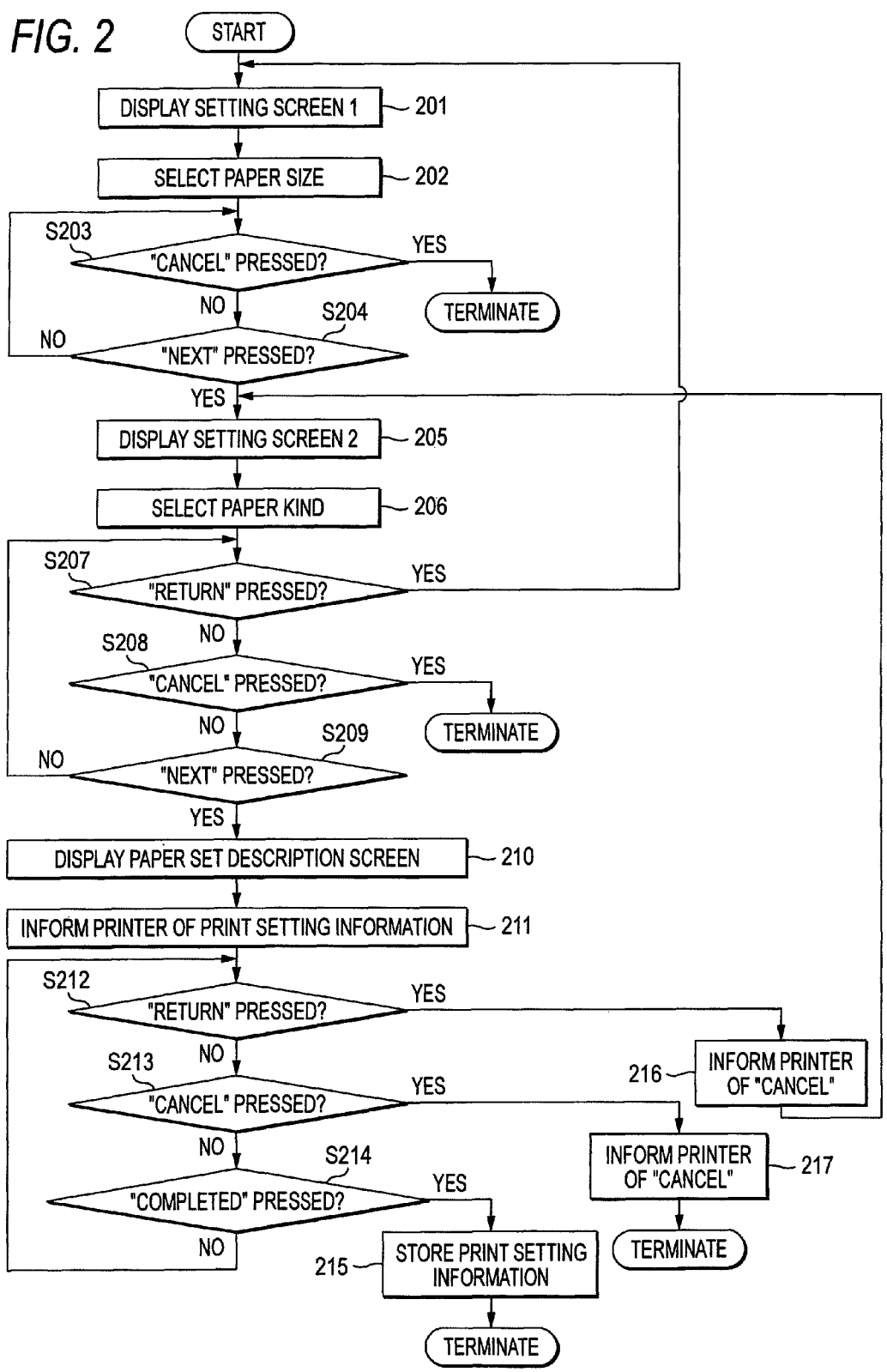

IMAGE FORMING SYSTEM AND PRINT INSTRUCTION TERMINAL

CROSS-REFERENCE TO RELATED APPLICATION

This application is based on and claims priority under 35 USC 119 from Japanese Patent Application No. 2010-054549 filed on Mar. 11, 2010.

BACKGROUND

1. Technical Field

The present invention relates to an image forming system and a print instruction terminal.

2. Related Art

In the related art, there has been a need to set information such as paper size and so on in a printer when the printer performs a print operation.

SUMMARY

According to an aspect of the invention, an image forming system includes: a print instruction terminal; and a print apparatus having a printing unit that prints print data instructed to be printed from the print instruction terminal, wherein the print instruction terminal includes: a setting information receiving unit that receives print setting information including paper attributes for printing from an operator; a loading method displaying unit that displays, to the operator, a method of loading paper corresponding to the print setting information received by the setting information receiving unit in a feeding unit of the print apparatus; and a transmitting unit that transmits the print setting information received by the setting information receiving unit to the print apparatus, and wherein the print apparatus includes a first print controlling unit that receives the print setting information sent by the transmitting unit and controls the printing unit to print the print data instructed to be printed from the print instruction terminal based on the print setting information when the paper set to be printed is loaded in the feeding unit.

BRIEF DESCRIPTION OF THE DRAWINGS

Embodiments of the invention will be described in detail based on the following figures, wherein:

FIG. 2 is a flow chart showing a process performed by a personal computer 100;

DETAILED DESCRIPTION

Hereinafter, embodiments of the present invention will be described with reference to the accompanying drawings.

First, an image processing system 1 related to an image forming system and a print instruction terminal of the present invention will be described with reference to FIG. 1.

Figure 1:
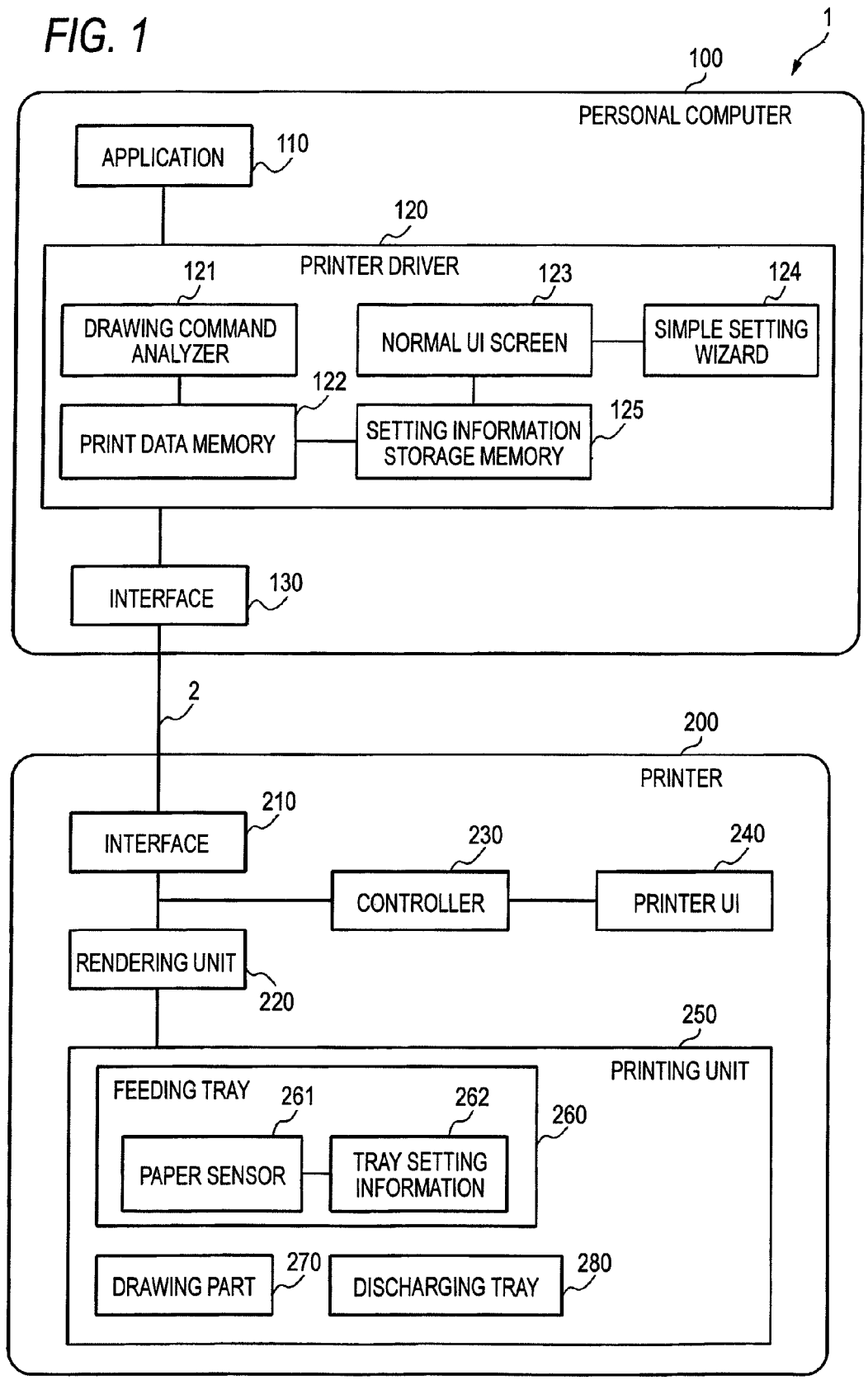
FIG. 1 is a schematic view showing a configuration of an image processing system 1.

FIG. 1 is a schematic view showing a configuration of the image processing system 1.

As shown in FIG. 1, the image processing system 1 includes a personal computer 100 which issues a print instruction and a printer 200, which are connected via a communication line 2.

The personal computer 100 is a computer including a CPU (Central Processing Unit), a ROM (Read Only Memory), a RAM (Random Access Memory), a HDD (Hard Disk Drive), a keyboard and a monitor, none of which are shown in the figure.

The personal computer 100 includes, as its functional elements, an application 110 as a document creating software having a print function, a printer driver 120 which generates print data of a document created by the application 110, and an interface 130 which exchanges information with the printer 200 through the communication line 2.

The printer driver 120 includes a drawing command analyzer 121, a print data memory 122, a normal user interface screen (hereinafter referred to as "normal UI screen," also in the drawings) 123, a simple setting wizard 124 and a setting information storage memory 125.

The drawing command analyzer 121 analyzes a drawing command from the application 110 and processes the analyzed drawing command into print data.

The print data memory 122 stores the print data.

The normal UI screen 123 provides a user interface screen which allows a user to set his/her intended print operation.

The simple setting wizard 124 simply sets a paper size and a paper kind and explains to a user how to set a set paper into the printer 200 with pictures so that the user may easily understand.

The setting information storage memory 125 uses a RAM (not shown) contained in the personal computer 100 to store print setting information set by the simple setting wizard 124.

The printer 200 includes an interface 210, a rendering unit 220, a controller 230, a printer user interface (hereinafter referred to as "printer UI," also in the drawings) 240 and a printing unit 250.

The interface 210 is a printer side interface which connects the personal computer 100 and the printer 200 and receives data from the personal computer 100.

The rendering unit 220 converts print data into image data.

The controller 230 controls the printer 200 overall.

The printer UI 240 displays messages and the like to a user and also receives inputs from the user.

The printing unit 250 receives the image data from the rendering unit 220 and prints the received image data on the paper.

The printing unit 250 includes a feeding tray 260, a drawing part 270 and a discharging tray 280.

The feeding tray 260 feeds paper stored therein and conveys the paper to the drawing part. In addition, the feeding tray 260 has a paper sensor 261 and tray setting information 262.

The paper sensor 261 is a sensor used to determine whether or not paper is stored in the feeding tray 260.

The paper sensor 261 has no function to detect a size of the paper stored in the feeding tray 260. Therefore, since the printer 200 has no sensors to detect the size and kind of the paper stored in the feeding tray 260, it sets the size and kind of paper to be printed based on information sent from the personal computer 100.

The tray setting information 262 holds print setting information including paper attributes of the size and kind of the paper stored in the feeding tray 260.

The print setting information including the paper attributes of the size and kind of the paper, which is held by the tray setting information 262, is controlled by the controller 230.

The tray setting information 262 is configured by a rewritable memory.

The drawing part 270 draws an image on the conveyed paper. A drawing method of the drawing part 270 may include, but is not limited to, a zerography method, an inkjet method or the like.

The discharging tray 280 discharges the paper which is a result of the printing by the drawing part 270.

Next, a process performed by the personal computer 100 will be described with reference to FIG. 2.

FIG. 2 is a flow chart showing a process performed by the personal computer 100.

Figure 3A:
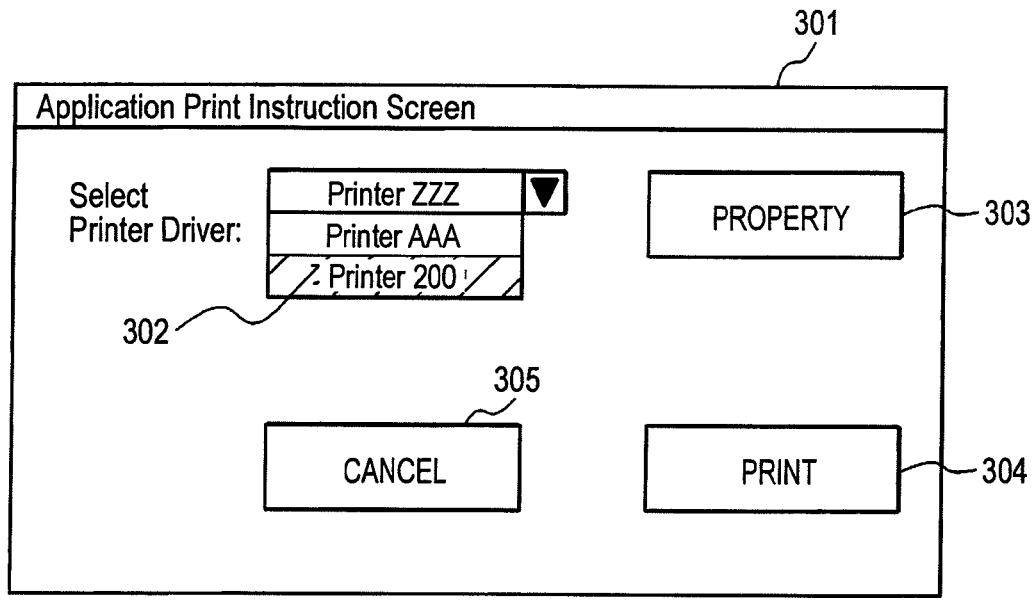
FIGS. 3A and 3B are a screen configuration view showing a print instruction screen 301 and a normal UI screen 123.

A user instructs the personal computer 100 to execute the application 110 having the print function and open a print instruction screen 301 of the application 110, as shown in FIG. 3A.

FIG. 3A is a screen configuration view showing the print instruction screen 301 of the application 110.

As shown in FIG. 3A, the print instruction screen 301 is displayed with a printer driver selection section 302 for selecting a printer driver, a "property" button 303 for opening a setting screen of the printer driver selected in the printer driver selection section 302, a "print" button 304 for instructing a print operation, and a "cancel" button 305 for canceling the print operation.

When the print instruction screen 301 is displayed, the user selects a printer driver of a printer, which is a desired print destination, from the printer driver selection section 302, as shown in FIG. 3A.

Then, as shown in FIG. 3A, after selecting a printer driver from the printer driver selection section 302, the user presses the "property" button 303.

Here, the following description will be given assuming that the printer 200 is selected from the printer driver selection section 302.

Figure 3B:
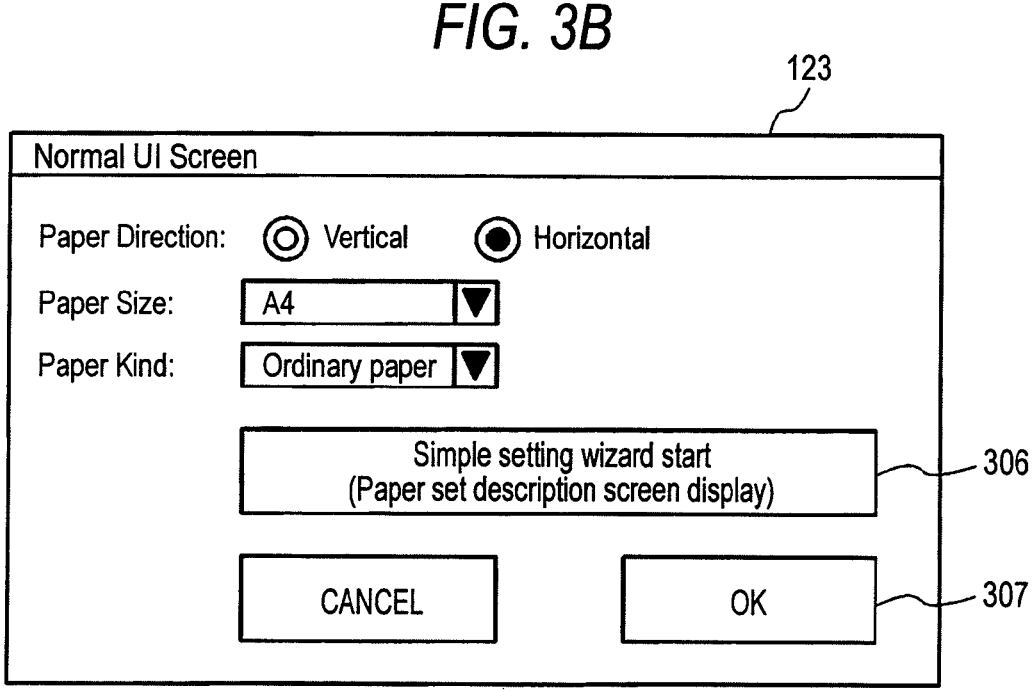

When the "property" button 303 is pressed, a normal UI screen 123 is displayed which is a setting screen of the printer 200 selected from the printer driver selection section 302, as shown in FIG. 3B.

FIG. 3B is a screen configuration view showing the normal UI screen 123.

As shown in FIG. 3B, the normal UI screen 123 is displayed with a setting section for allowing print settings (paper direction, paper size, paper kind and the like) intended by a user, a "simple setting wizard start" button 306 and an "OK" button 307.

When the "simple setting wizard start" button 306 is pressed in the normal UI screen 123, a simple setting wizard 124 is started up.

The simple setting wizard 124 includes display of a paper set description screen which is convenient when paper set in the wizard 124 is set (loaded) in the printer 200.

When the simple setting wizard 124 is started up, setting screen 1 (420) is displayed on the monitor (not shown) of the personal computer 100 (Step 201 in FIG. 2), as shown in FIG. 2.

Here, the setting screen 1 (420) will be described with reference to FIG. 4A.

Figure 4A:
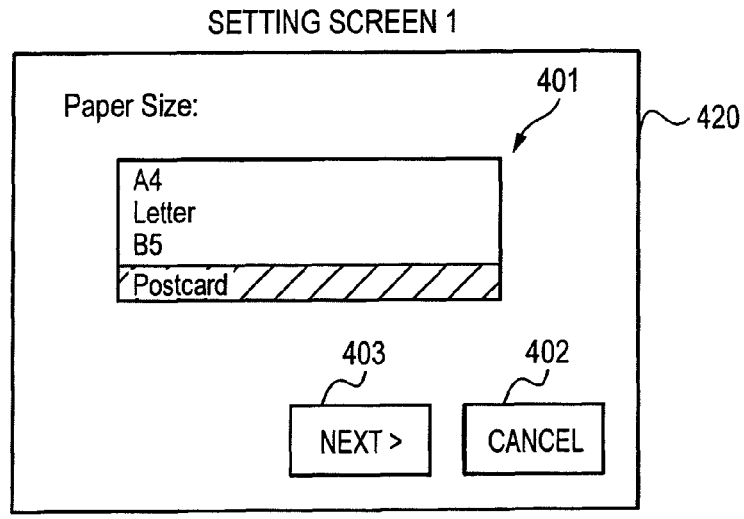
FIGS. 4A, 4B and 4C are a screen configuration view showing an example of a screen of a simple setting wizard 124.

FIG. 4A is a screen configuration view showing the setting screen 1 (420) in the simple setting wizard 124.

The setting screen 1 (420) may be set with an item which a user often requests to be modified from a print setting (including contents set in default) set in the normal UI screen 123 and an item which has an effect on a method of setting paper into the printer 200 (here, for example, a paper size setting will be illustrated).

As shown in FIG. 4A, the setting screen 1 (420) is displayed with a paper size setting section 401 which allows a paper size setting, a "cancel" button 402 for canceling set contents of the setting screen 1 (420) and terminating the simple setting wizard 124, and a "next" button 403 for transition to the next setting screen.

While a print setting (including a default setting) set in the normal UI screen 123 is displayed as a default in the paper size setting section 401 of the setting screen 1 (420) when the setting screen 1 (420) is displayed, a user may select a desired paper size from the paper size setting section 401 (Step 202).

As shown in FIG. 4A, the user selects "postcard" from the setting screen 1 (420).

Contents selected in the paper size setting section 401 in Step 202 is stored in the RAM (not shown) of the personal computer 100.

If the "cancel" button 402 in the setting screen 1 (420) is pressed by the user (YES in Step 203 of FIG. 2), the simple setting wizard 124 is terminated without application of the contents selected by the user in the paper size setting section 401 in Step 202.

Figure 4B:
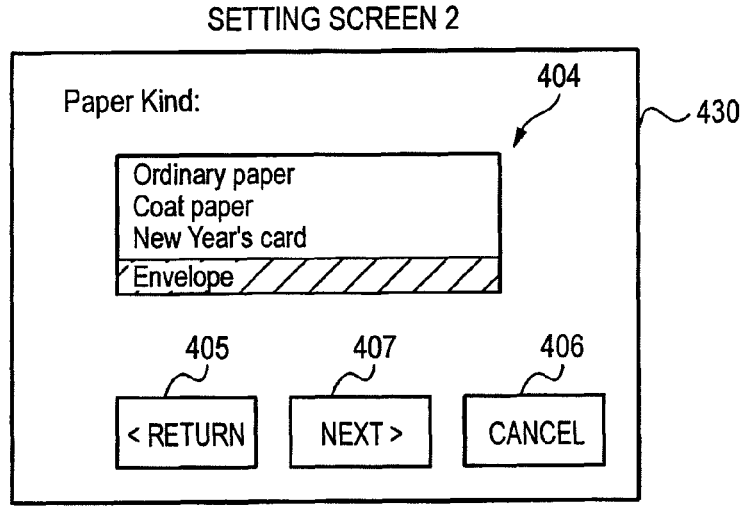

If the "cancel" button 402 in the setting screen 1 (420) is not pressed by the user (NO in Step 203) and the "next" button 403 is pressed by the user (YES in Step 204), setting screen 2 (430) shown in FIG. 4B is displayed on the monitor (not shown) of the personal computer 100, instead of the setting screen 1 (420) (Step 205).

FIG. 4B is a screen configuration view showing the setting screen 2 (430).

The setting screen 2 (430) may be set with an item which a user often requests to be modified from a print setting (including contents set in default) set in the normal UI screen 123 and an item which has an effect on a method of setting paper into the printer 200 (here, for example, a paper kind setting will be illustrated).

As shown in FIG. 4B, the setting screen 2 (430) is displayed with a paper kind setting section 404 which allows a paper kind setting, a "return" button 405 for returning to the setting screen 1 (420) by causing the setting screen 1 (420) to be displayed instead of the setting screen 2 (430), a "cancel" button 406 for canceling contents selected in the setting screen 1 (420) or the setting screen 2 (430) to terminate the simple setting wizard 124, and a "next" button 407 for transition to the paper set description screen.

While a print setting (including a default setting) set in the normal UI screen 123 is displayed as a default in the paper kind setting section 404 of the setting screen 2 (430) when the setting screen 2 (430) is displayed, a user may select a desired paper kind from the paper kind setting section 404 (Step 206).

As shown in FIG. 4B, the user selects "envelope" from the setting screen 2 (430).

Contents selected in the paper kind setting section 404 in Step 206 is stored in the RAM (not shown) of the personal computer 100.

When the user presses the "return" button 405 in the setting screen 2 (430) (YES in Step 207), the setting screen 1 (420) is displayed so that the contents selected in Step 202 may be selected from the default, instead of the setting screen 2 (430) (to Step 201 via coupler A).

If the "cancel" button 406 in the setting screen 2 (430) is pressed by the user (YES in Step 208), the simple setting wizard 124 is terminated without application of the contents selected by the user in the paper size setting section 401 of the setting screen 1 (420) and the contents selected by the user in the paper kind setting section 404 of the setting screen 2 (430).

Figure 4C:
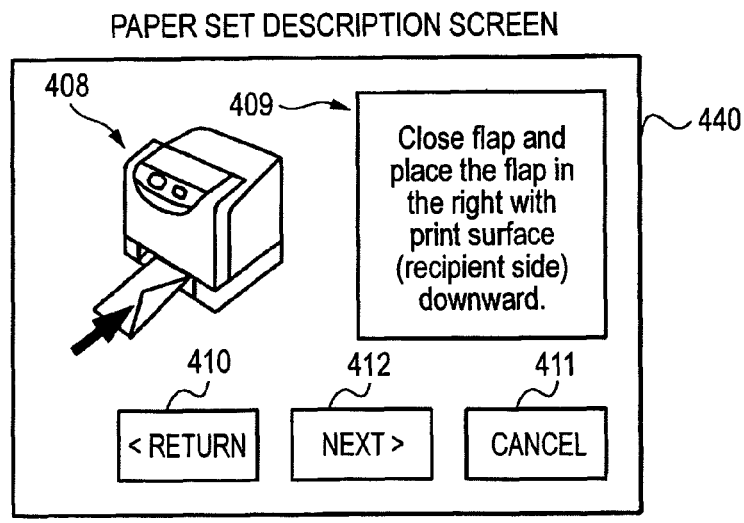

If the user does not press the "return" button 405 in the setting screen 2 (430) and does not press the "cancel" button 406 (NO in Step 208) and presses the "next" button 407 (YES in Step 209), a paper set description screen 440 shown in FIG. 4C is displayed instead of the setting screen 2 (430) (Step 210).

FIG. 4C is a screen configuration view showing the paper set description screen 440 as one example of a paper set description screen.

When the paper set description screen 440 is displayed, the contents which are selected from the paper size setting section 401 of the setting screen 1 (420) in Step 202 and are stored in the RAM (not shown) of the personal computer 100, and the contents, which are selected from the paper kind setting section 404 of the setting screen 2 (430) in Step 206 and are stored in the RAM (not shown) of the personal computer 100, are transmitted, as print setting information, to the printer 200 (Step 211).

The paper set description screen 440 is displayed with contents describing a method of setting paper in the printer 200, which is determined based on the contents which are selected from the paper size setting section 401 of the setting screen 1 (420) in Step 202 and are stored in the RAM (not shown) of the personal computer 100 and the contents which are selected from the paper kind setting section 404 of the setting screen 2 (430) in Step 206 and are stored in the RAM (not shown) of the personal computer 100.

As shown in FIG. 4C, the paper set description screen 440 is displayed with a picture 408 and a sentence 409 for explanation of the method of setting paper in the printer 200, a "return" button 410 for returning to the setting screen 2 (430) by causing the setting screen 2 (430) to be displayed instead of the paper set description screen 440, a "cancel" button 411 for canceling contents selected in the setting screen 1 (420) or the setting screen 2 (430) to terminate the simple setting wizard 124, and a "completed" button 412 for storing the contents selected in the setting screen 1 (420) and the setting screen 2 (430) in the setting information storage memory 125 and then terminating the simple setting wizard 124.

In the picture 408 and sentence 409 for explanation of the method of setting paper in the printer 200, how to set (load) paper corresponding to the paper size selected in the setting screen 1 (420) and the paper kind selected in the setting screen 2 (430) in the feeding tray 260 of the printer 200 is described to facilitate a user's understanding.

As shown in FIG. 4C, for example, the picture 408 for explanation of the method of setting paper in the printer 200 is a picture showing appearance figure where an envelope, which is paper corresponding to the paper size selected in the setting screen 1 (420) and the paper kind selected in the setting screen 2 (430), is set in the feeding tray 260 of the printer 200.

As another example, as shown in FIG. 4C, the picture 408 for explanation of the method of setting paper in the printer 200 is a picture showing a direction in which an envelope as paper corresponding to the paper size selected in the setting screen 1 (420) and the paper kind selected in the setting screen 2 (430) is set in the feeding tray 260 of the printer 200, open/close of a flap of the envelope, position of the feeding tray 260 to be set, etc.

In addition, for example, the sentence 409 for explanation of the method of setting paper in the printer 200 is "Close flap and place the flap on the right with the print surface (recipient side) downward.", as shown in FIG. 4C.

In this manner, the sentence 409 for explanation of the method of setting paper in the printer 200 describes whether the paper corresponding to the paper size selected in the setting screen 1 (420) and the paper kind selected in the setting screen 2 (430) is set with its print surface up or down (direction of both surfaces of the paper), for example, as shown in FIG. 4C, a method of setting a special paper such as an envelope or the like (whether an envelope is set with its flap closed or opened), forward and backward directions with respect to the conveyance direction of the paper when the paper is set in the feeding tray 260 (for example, whether an envelope is set with its flap located on the right or left of the paper conveyance direction (with the directions of both surfaces of the paper unchanged)), etc.

Accordingly, from the picture 408 and sentence 409 for explanation of the method of setting paper in the printer 200, a user may surely know how to set the paper selected in the setting screen 1 (420) and the setting screen 2 (430) in the printer 200.

If the user presses the "return" button 410 in the paper set description screen 440 (YES in Step 212), a cancel notification is transmitted from the personal computer 100 to the printer 200 via the interface 130 (Step 216) and the setting screen 2 (430) is displayed so that the contents selected in Step 206 may be selected from the default, instead of the paper set description screen 440 (to Step 205 via coupler B).

If the "return" button 410 in the paper set description screen 440 is not pressed (NO in Step 212) and the "cancel" button 411 is pressed (YES in Step 213), a cancel notification is transmitted from the personal computer 100 to the printer 200 via the interface 130 (Step 217) and the simple setting wizard 124 is terminated without application of the contents selected by the user in the setting screen 1 (420) and the contents selected by the user in the setting screen 2 (430).

If the "return" button 410 in the paper set description screen 440 is not pressed (NO in Step 212), the "cancel" button 411 is not pressed (NO in Step 213) and the "completed" button 412 is pressed (YES in Step 214), the contents which are selected from the paper size setting section 401 of the setting screen 1 (420) in Step 202 and are stored in the RAM (not shown) of the personal computer 100, and the contents, which are selected from the paper kind setting section 404 of the setting screen 2 (430) in Step 206 and are stored in the RAM (not shown) of the personal computer 100, are stored as print setting information in the setting information storage memory 125 (Step 215).

When the print setting information is stored in the setting information storage memory 125 in Step 215, the simple setting wizard 124 is terminated.

When the simple setting wizard 124 is terminated, since the normal UI screen 123 is displayed on the monitor (not shown) of the personal computer 100, the user presses the "OK" button 307 to apply the print setting and then the normal UI screen 123 is closed.

When the normal UI screen 123 is closed, since the print instruction screen 301 is displayed on the monitor (not shown) of the personal computer 100, the user presses the "print" button 304 to instruct a print operation.

When the print operation is instructed from the print instruction screen 301 of the application 110 (i.e., when the "print" button 304 is pressed), a drawing command for printing a sentence created by the application 110 is sent from the application 110 to the printer driver 120.

The drawing command analyzer 121 of the printer driver 120 analyzes the sent drawing command, processes the analyzed drawing command into print data which are then stored in the print data memory 122.

In the printer driver 120, the print setting information stored in the setting information storage memory 125 is added to the print data.

The print data are transmitted to the printer 200 via the interface 130.

Next, as another example of the earlier-described setting screen 1 (420), setting screen 2 (430) and paper set description screen 440, setting screen 1 (510), setting screen 2 (520) and a paper set description screen 530 will be described with reference to FIGS. 5A and 5B.

Figure 5A:
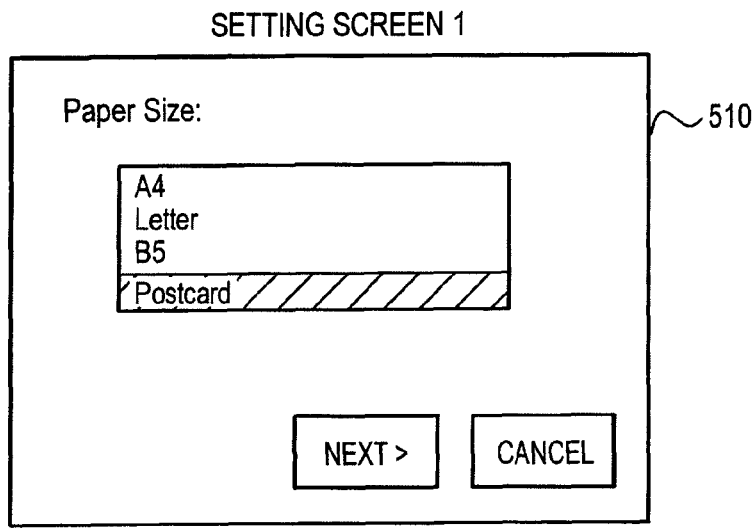
FIGS. 5A, 5B and 5C are a screen configuration view showing an example of a screen of a simple setting wizard 124.
Figure 5B:
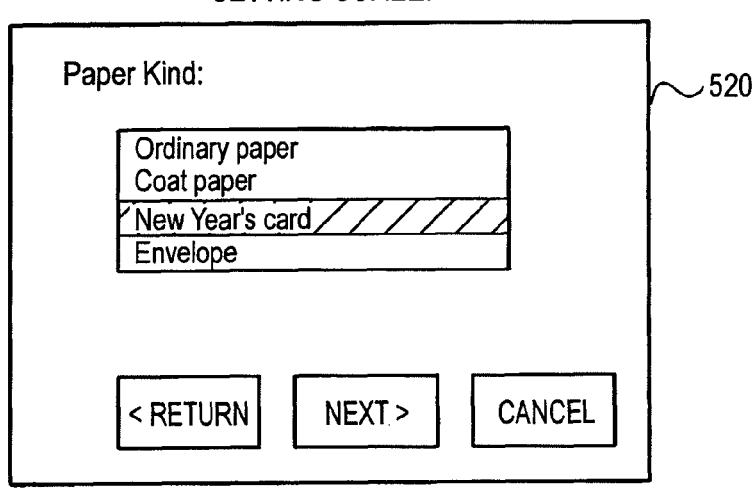
Figure 5C:
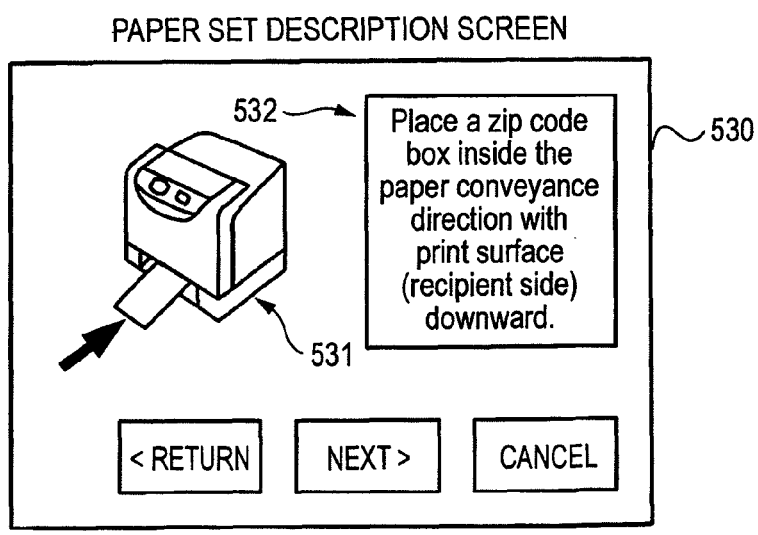

FIGS. 5A and 5B is a screen configuration view showing a screen displayed when the "simple setting wizard start" button 306 is pressed, FIG. 5A being a screen configuration view showing the setting screen 1 (510), FIG. 5B being a screen configuration view showing the setting screen 2 (520) and FIG. 5C being a screen configuration view showing the paper set description screen 530 as one example of a paper set description screen.

In a process of the personal computer 100, the setting screen 1 (510) shown in FIG. 5A is displayed in Step 201.

A user selects "postcard" from the setting screen 1 (510), as shown in FIG. 5A.

Then, the setting screen 2 (520) shown in FIG. 5B is displayed in Step 205.

In addition, the user selects "New Year's card" from the setting screen 2 (520), as shown in FIG. 5B.

Then, the paper set description screen 530 shown in FIG. 5C is displayed in Step 210.

In this manner, when a paper size is selected as the "postcard" and a paper kind is selected as the "New Year's card," the paper set description screen 530 is displayed with a picture 531 and a sentence 532 for explanation of the method of setting paper in the printer 200 according to the selected contents.

That is, for the picture 531 for explanation of the paper setting method, a picture showing a figure where the paper size set as "postcard" and the paper kind is set as "New Year's card" is displayed to facilitate a user's understanding.

In addition, for the sentence 532 for explanation of the paper setting method, a sentence showing how to set the paper size as "postcard" and the paper kind as "New Year's card" is displayed to facilitate a user's understanding.

The sentence 532 for explanation of the paper setting method is described in such a manner that a user may find a set direction of a print surface of the paper and a set direction of a zip code box of the paper, such as, for example, "Place so that a zip code box is inside the paper conveyance direction with print surface (recipient side) downward."

Next, a process of the printer 200 will be described with reference to FIGS. 6A to 7B.

Figure 6A:
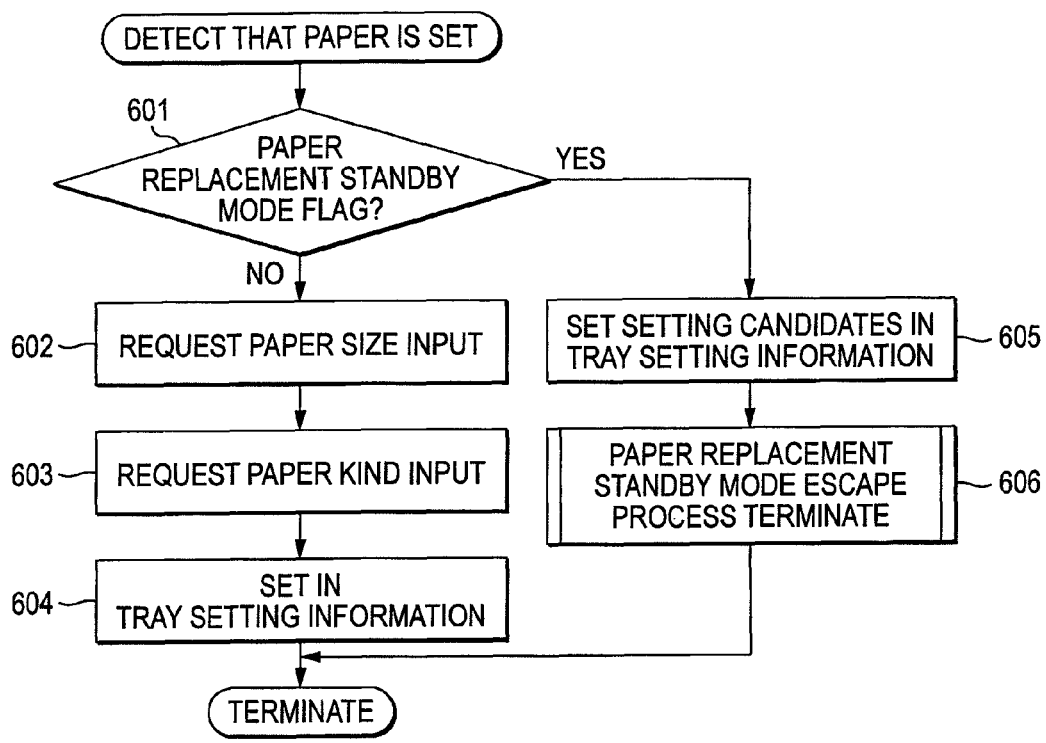
FIGS. 6A, 6B and 6C are a flow chart showing a process of a printer 200.
Figure 6B:
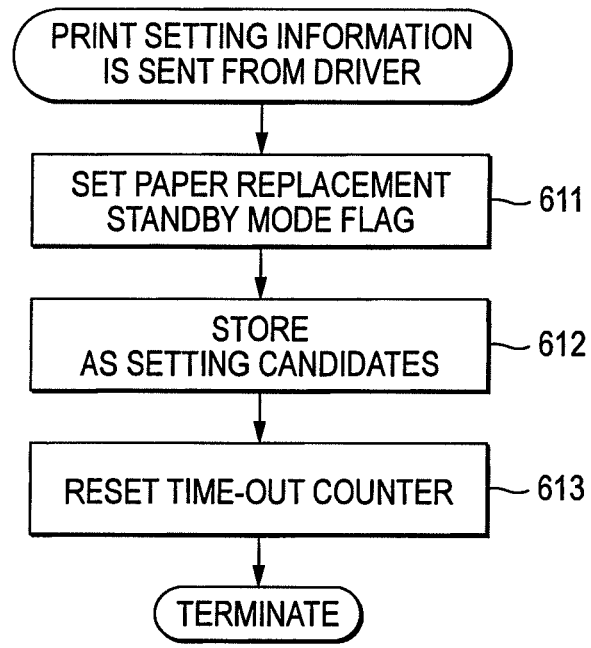
Figure 6C:
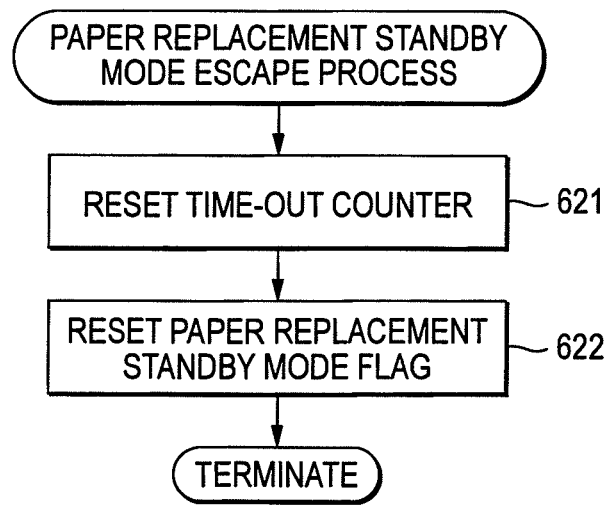
Figure 7A:
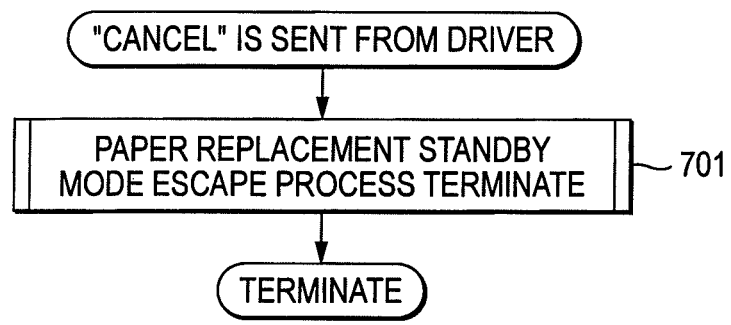
FIGS. 7A, and 7B are a flow chart showing a process of a printer 200.
Figure 7B:
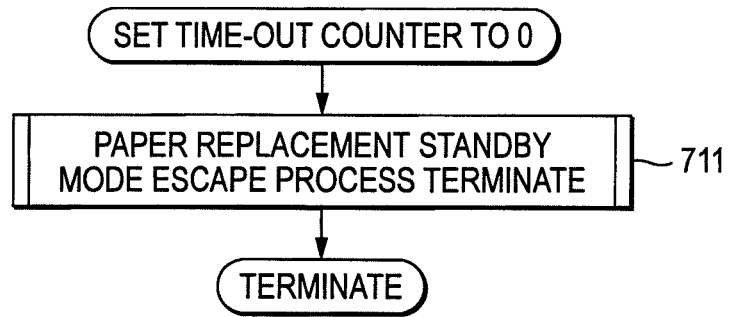

FIGS. 6A to 7B are flow charts showing a process of the printer 200, FIG. 6A being a flow chart showing a process of the printer 200 after the paper sensor 261 senses that paper is being stored, FIG. 6B being a flow chart showing a process after receiving print setting information from the printer driver 120, FIG. 6C being a flow chart showing a paper replacement standby mode release process, FIG. 7A being a flow chart showing a process after receiving a cancel notification from the printer driver 120, and FIG. 7B being a flow chart showing a process when a time-out counter in the printer 200 becomes 0.

In the printer 200, when paper is set in the feeding tray 260, the controller 230 detects that the paper is loaded in the feeding tray 260 based on information sent from the paper sensor 261.

The controller 230, which detected that the paper is loaded in the feeding tray 260, checks whether or not a paper replacement standby mode flag (which will be described in detail later, but is for when the printer 200 receives the print setting information from the personal computer 100, the paper replacement standby mode flag is turned "on") is "on" or not (Step 601).

If the paper replacement standby mode flag is not "on" (NO in Step 601), the controller 230 causes the printer UI 240 to display a paper size input request to a user (Step 602).

The user inputs a paper size of paper set in the feeding tray 260 to the printer UI 240.

When the printer UI 240 receives the paper size input from the user, the controller 230 causes the printer UI 240 to display a paper kind input request to the user (Step 603).

The user inputs a paper kind of the paper set in the feeding tray 260 to the printer UI 240.

When the printer UI 240 receives the paper size input from the user, the controller 230 causes the print setting information including paper attributes of the received paper size and paper kind to be held in the tray setting information 262 (Step 604).

In this manner, even a printer 200 having no sensors to detect a paper size and a paper kind may set the paper size and the paper kind.

Next, a process of the printer 200 when the print setting information is sent from the printer driver 120 of the personal computer 100 will be described with reference to FIG. 6B.

In the printer 200 which received the print setting information from the printer driver 120 of the personal computer 100, the paper replacement standby mode flag is set as "on" by the controller 230(Step 611).

The paper replacement standby mode flag is stored in the rewritable memory (not shown) of the printer 200.

When the paper replacement standby mode flag is "on," the controller 230 stores the print setting information received from the personal computer 100, as setting candidates, in the rewritable memory (not shown) (Step 612).

Once the print setting information is stored, the controller 230 initiates a measurement by resetting the time-out counter and counts a predetermined period of time (Step 613).

The time-out counter counts the predetermined period of time by decrementing display time as time passes.

According to such processes of Steps 611, 612 and 613 shown in FIG. 6B, the printer 200 transitions to a paper replacement standby mode.

Next, a process when paper is set in the feeding tray 260 in the paper replacement standby mode of the printer 200 will be described with reference to FIG. 6A.

The user sets paper in the feeding tray 260 of the printer 200.

The controller 230, which detects the paper loaded in the feeding tray 260, checks whether or not the paper replacement standby mode flag is "on" or not (Step 601).

If the paper replacement standby mode flag is "on" (YES in Step 601), the controller 230 holds the setting candidates stored in advance in the rewritable memory (not shown), as the print setting information, in the tray setting information 262 without accepting the print setting information from the printer UI 240 (Step 605).

This process eliminates a need to input the print setting information including paper attributes of the paper size and paper kind from the printer UI 240 when the user sets the paper in the feeding tray 260 according to the description of the paper set description screen (the paper set description screen 440, the paper set description screen 530, etc.) viewed by the user on the personal computer 100.

In addition, according to this process, when the paper replacement standby mode flag is "on," a print operation based on the print setting information input from the print UI 240 is preceded by a print operation based on the print setting information sent from the personal computer 100.

Then, the controller 230 performs a paper replacement standby mode release process (Step 606).

Here, the paper replacement standby mode release process will be described with reference to FIG. 6C.

In the paper replacement standby mode release process, as shown in FIG. 6C, the controller 230 resets the time-out counter to initiate a count for a predetermined period of time (Step 621).

After Step 621, the controller 230 resets the paper replacement standby mode flag from "on" to "off" (Step 622).

According to Steps 621 and 622, the printer 200 is released from the paper replacement standby mode and transitions to a normal mode.

If a cancel notification is sent to the printer 200 according to Step 216 in the personal computer, the printer 200, which received the cancel notification, performs the paper replacement standby mode release process (Step 701), as shown in FIG. 7A.

The paper replacement standby mode release process (Step 701) is the same as the paper replacement standby mode release processes performed in Steps 621 and 622 described with reference to FIG. 6C.

According to the paper replacement standby mode release process in Step 701, the printer 200 is released from the paper replacement standby mode and transitions to a normal mode if a normal termination (YES in Step 214) is not made although the paper set description screen is displayed in the simple setting wizard 124 of the printer driver 120 of the personal computer 100.

When the time-out counter reset by the controller 230 in Steps 613 and 621 becomes 0, the printer 200 performs the paper replacement standby mode release process (Step 711).

The paper replacement standby mode release process (Step 711) is the same as the paper replacement standby mode release processes performed in Steps 621 and 622 described with reference to FIG. 6C.

According to the paper replacement standby mode release process in Step 711, the printer 200 is released from the paper replacement standby mode and transitions to a normal mode when a predetermined period of time has elapsed after the paper set description screen is displayed in the simple setting wizard 124 of the personal computer 100 and a normal termination (YES in Step 214) is made.

When print data are sent from the printer driver 120 of the personal computer 100 via the interface 210, the print data are rendered by the rendering unit 220, and, in the printing unit 250, paper is fed from the feeding tray 260, the print data are drawn on the paper by the drawing part 270 and the paper with the print data drawn thereon is discharged to the discharging tray 280. As a result, a user obtains a print matter on a desired paper.

Although it has been illustrated in the above that a setting user interface for one item (one of the paper size and the paper kind) is placed in each of two setting screens, such as the setting screen 1 and the setting screen 2, in the simple setting wizard 124, the number of setting screens is not limited to two but plural of setting user interfaces may be placed in one setting screen.

In addition, in order to realize a simple setting by a user, the number of items in which the setting user interfaces are placed in the simple setting wizard 124 may be as small as possible by limiting the items to those frequently changed by the user.

This invention is applicable to image forming systems and print instruction terminals.

The image processing program of the present invention may be provided through a communications means as well as a recording medium such as a CD-ROM or the like having the program recorded thereon.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   a print instruction terminal; and
   a print apparatus comprising:
      a first print controlling unit,
      a memory that is controlled by the first print controlling unit,
      a printing unit that prints print data instructed to be printed from the print instruction terminal and holds tray setting information, wherein the printing unit includes a feeding tray,
   wherein the print instruction terminal includes:
      a display unit that displays a first screen for setting a paper kind;
      a setting information receiving unit that receives setting information of the paper kind input via the first screen; and
      a transmitting unit that transmits the setting information received by the setting information receiving unit to the print apparatus,
      wherein the display unit that displays a second screen after the first screen, and
      the second screen includes a picture of a paper corresponding to the received setting information of the paper kind and direction information indicating a correct direction of the paper to be loaded in the feeding tray,
   wherein the first print controlling unit of the print apparatus receives the setting information of the paper kind sent by the transmitting unit of the print instruction terminal and stores the received setting information of the paper kind in the memory, and
   wherein the first print controlling unit, in response to the reception of the setting information of the paper kind and the detection of loading the paper in the feeding tray, uses the setting information of the paper kind stored in the memory as the tray setting information and controls the printing unit to print the print data instructed to be printed from the print instruction terminal based on the tray setting information,
   wherein the print apparatus manages a paper replacement standby mode, the paper replacement standby mode is on in response to the reception of the setting information of the paper kind, in a case that the paper replacement standby mode is on, the print apparatus performs a print control by the first print controlling unit in response to the detection of loading the paper in the feeding try, and wherein the print apparatus further includes:

a receiving unit that receives the setting information of the paper kind from an operator; and a second print controlling unit that controls, in a case that the paper replacement standby mode is off, the printing unit to print the print data on the paper having the paper kind indicated by the setting information of the paper kind received by the receiving unit, and wherein, upon receiving the setting information of the paper kind transmitted by the transmitting unit, the print control by the first print controlling unit is given priority over a print control by the second print controlling unit.

2. The image forming system according to claim 1, wherein the second screen includes a sentence so as to explain a loading method of the paper.

3. The image forming system according to claim 1, wherein the transmitting unit of the print instruction terminal transmits the setting information of the paper kind to the print apparatus in response to the displays of the second screen.

4. The image forming system according to claim 1, wherein the print apparatus further includes:

a cancel instruction receiving unit that receives an instruction to cancel the print; and a cancel notification transmitting unit that transmits a cancel notification to the print apparatus upon receiving the cancel instruction from the cancel instruction receiving unit after the transmitting unit transmits the j3fffit— setting information of the paper kind, and wherein, upon receiving the cancel instruction, the print apparatus releases the priority of the print control by the first print controlling unit.

5. The image forming system according to claim 1, wherein the print apparatus further includes a detecting unit that detects that the paper is loaded in the feeding tray, and wherein, upon receiving setting information of the paper kind sent by the transmitting unit, the print apparatus performs the print control by the first print controlling unit if the detecting unit detects the loading of the paper within a period of time.

6. The image forming system according to claim 1, wherein, if the detecting unit does not detect the loading of the paper within a period of time after receiving the setting information of the paper kind sent by the transmitting unit, the print apparatus performs the print control by the second print controlling unit based on the setting information of the paper kind received by the receiving unit.

7. The image forming system according claim 1, wherein the second screen includes positional information of the feeding tray.

8. The image forming system according to claim 1, wherein the second screen includes information of which side of the paper is upward facing in the feeding tray.

9. The image forming system according to claim 1, wherein the paper is an envelope, and wherein the second screen includes information indicating the envelope is loaded in a state wherein a flap of the envelope is opened or the envelope is loaded in a state wherein the flap of the envelope is closed.

* * * * *